United States Patent [19]

Connolly et al.

[11] Patent Number: 4,889,779
[45] Date of Patent: Dec. 26, 1989

[54] LITHIUM-SULFUR DIOXIDE ELECTROCHEMICAL CELL WITH AN IODINE-CATALYZED CATHODE

[75] Inventors: John F. Connolly, Glen Ellyn; Robert J. Thrash, Carol Stream, both of Ill.

[73] Assignee: Amoco Corporation, Chicago, Ill.

[21] Appl. No.: 857,306

[22] Filed: Apr. 30, 1986

Related U.S. Application Data

[63] Continuation-in-part of Ser. No. 776,599, Sep. 16, 1985, Pat. No. 4,612,265.

[51] Int. Cl.$^4$ .............................................. H01M 6/14
[52] U.S. Cl. ..................................... 429/196; 429/197
[58] Field of Search ................................. 429/196, 197

[56] References Cited

U.S. PATENT DOCUMENTS

| | | | |
|---|---|---|---|
| 3,567,515 | 3/1971 | Maricle et al. | 429/105 |
| 3,985,573 | 10/1976 | Johnson et al. | 429/133 |
| 4,482,616 | 11/1984 | Connolly et al. | 429/197 |
| 4,612,265 | 9/1986 | Connolly et al. | 429/196 |

*Primary Examiner*—John F. Niebling
*Assistant Examiner*—Steven P. Marquis
*Attorney, Agent, or Firm*—Richard A. Kretchmer; William H. Magidson; Ralph C. Medhurst

[57] ABSTRACT

The incorporation of both iodide ion and iodine into the electrolyte of a lithium-sulfur dioxide electrochemical cell improves the cathode discharge capacity of the cell.

18 Claims, No Drawings

LITHIUM-SULFUR DIOXIDE ELECTROCHEMICAL CELL WITH AN IODINE-CATALYZED CATHODE

CROSS-REFERENCE TO RELATED APPLICATIONS

This application is a continuation-in-part of application Ser. No. 776,599, filed Sept. 16, 1985, U.S. Pat. No. 4,612,265.

BACKGROUND OF THE INVENTION

1. Field of the Invention

This invention relates to an improved lithium-sulfur dioxide electrochemical cell. More particularly, it relates to the use of iodine and iodide ion as electrolyte components in lithium-sulfur dioxide cells.

2. Description of the Prior Art.

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watt-hours per kilogram of all known active metals.

In conventional electrochemical cells, cathode depolarizers are used in a form which will permit an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell.

Lithium-sulfur dioxide electrochemical cells, particularly those which utilize a carbon cathode, are frequently characterized by a limited cathode discharge-rate capability. This occasionally results in an explosion when such carbon-cathode cells are subjected to forced discharge conditions in a battery pack. Such explosions are believed to be a result of cathode shutoff as a result of the plugging of pores in the cathode by discharge products, followed by a deposition of lithium at the cathode which results in a potentially explosive combination of lithium, carbon and discharge products. Unfortunately, this explosion hazard serves to limit the utility of such cells under conditions where forced discharge may occur.

Canadian Pat. No. 878,713, issued on Aug. 17, 1971, discloses an electrochemical cell which contains a aqueous electrolyte comprised of an organic solvent selected from the group consisting of alkylene carbonates and lactones and an ion-permeable barrier to separate the anode and cathode depolarizer. However, this patent contains no suggestion that sulfur dioxide could be used as a component of such a cell.

U.S. Pat. No. 4,145,484, issued to Goodson et al. on Mar. 20, 1979, is directed to an electrochemical cell which utilizes a lithium anode in combination with a solution of a quaternary ammoninum salt in liquid bromine. The bromine functions as the cathode depolarizer and it is disclosed that the bromine solution can be placed in direct contact with the lithium anode as a consequence of the formation of a film of lithium bromide on the and surface. This patent contains no suggestion that either iodine or sulfur dioxide could be utilized in an electrochemical cell.

U.K. Pat. No. 2,056,752, published June 2, 1983, discloses an electrochemical cell which contains an active metal anode in direct contact with an electrolyte which comprises a free halogen dissolved in a nonaqueous solvent. It is disclosed that lithium can be used as the anode, iodine may be used as the halogen and the nonaqueous solvent may be selected from a plethora of organic and inorganic materials which include tetrahydrofuran. It is further disclosed that the ionic conduction of the electrolyte can be facilitated by dissolving in it a metal salt, such as a lithium halide. However, this patent contains no mention of sulfur dioxide.

The above-mentioned U.S. Pat. No. 3,567,515 (Maricle et al.) discloses an electrochemical cell which contains a lithium anode and a nonaqueous conductive liquid electrolyte which comprises sulfur dioxide. This patent also discloses that the electrolyte may contain an organic solvent and a plethora of electrolyte salts which include lithium perchlorate, lithium halides, and tetra(-loweralkyl)ammonium salts of halogens. U.S. Pat. No. 3,578,500 issued to Maricle et al. on May 11, 1971, contains a similar disclosure. However, these patents fail to suggest the use of iodine as an electrolyte component and require that the electrolyte salts be substantially inert with respect to chemical oxidation by sulfur dioxide.

It has been reported that iodide ion can be oxidized by sulfur dioxide, but only in the presence of oxygen (see Non-Aqueous Solvent Systems, T. C. Waddington, Ed., Academic Press, 1965, p. 266; and Progress in Physical Organic Chemistry, Vol. 1, S. G. Cohen et al., Ed., Interscience Publishers, 1963, p. 98). However, there has been no suggestion in the prior art that the oxidation of iodide ion by sulfur dioxide could be advantageously utilized for any purpose in an electrochemical cell.

SUMMARY OF THE INVENTION

The present invention is directed to the discovery that the incorporation of iodine and iodide ion into the electrolyte of a lithium-sulfur dioxide electrochemical cell results in an increased cathode discharge capacity, reduced cathode polarization during charge and discharge and a reduced explosion hazard upon exposure to forced discharge conditions.

One embodiment of the invention is an electrochemical cell comprising in combination: (a) an anode which is comprised of lithium; (b) a cathode; and (c) a nonaqueous conductive electrolyte which comprises a solution of iodine, at least one iodide salt and at least one lithium salt in sulfur dioxide, wherein the combined concentration of iodine and iodide ion in said electrolyte is at least about 0.2 normal and the lithium cation concentration in said electrolyte is at least about 0.2 normal.

Another embodiment of the invention is an electrochemical cell comprising in combination: (a) an anode which is comprised of lithium; (b) a cathode; and (c) a nonaqueous conductive electrolyte which comprises a solution of iodine, at least one iodide salt and at least one lithium salt in a mixture of sulfur dioxide and at least one polar organic solvent, wherein the amount of sulfur dioxide in said mixture of sulfur dioxide and polar organic solvent is in the range from about 25 to about 99 percent by weight, the combined concentration of iodine and iodide ion in said electrolyte is at least about 0.2 normal and the lithium cation concentration in said electrolyte is at least about 0.2 normal.

An object of the invention is to provide an improved lithium-sulfur dioxide electrochemical cell.

Another object of the invention is to provide a lithium-sulfur dioxide electrochemical cell which has an enhanced cathode discharge capacity.

Another object of the invention is to provide a rechargeable lithium-sulfur dioxide electrochemical cell which has a low overvoltage at the cathode during charge.

Another object of the invention is to provide an improved electrolyte for use in lithium-sulfur dioxide electrochemical cells.

A further object of the invention is to provide a lithium-sulfur dioxide electrochemical cell which is resistant to explosion upon exposure to forced discharge conditions.

DETAILED DESCRIPTION OF THE INVENTION

We have discovered that the incorporation of both iodide ion and iodine into the electrolyte of a lithium-sulfur dioxide electrochemical cell serves to improve the discharge capacity of the cathode and also reduces the possibility of explosion when such cells are subjected to forced discharge conditions. This invention is particularly suitable for use with lithium-sulfur dioxide cells which incorporate a carbon cathode.

Any iodide salt which is soluble in the electrolyte is suitable for use in the practice of this invention to provide the necessary iodide ion. Suitable iodide salts include, but are not limited to, lithium iodide, iodide salts containing a metal cation complex, quaternary ammonium iodides, phosphonium iodides, pyridinium iodides and arsonium iodides. Lithium iodide is highly preferred.

Preferred quaternary ammonium iodides for use in the practice of the invention are of the formula:

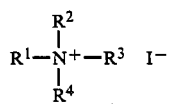

wherein $R^1$, $R^2$, $R^3$ and $R^4$ are independently selected from the group consisting of hydrocarbyl groups containing from 1 to 20 carbon atoms. More preferably, $R^1$, $R^2$, $R^3$ and $R^4$ are independently selected from the group consisting of alkyl groups having from 1 to 10 carbon atoms.

Suitable iodide salts containing a metal cation complex include, but are not limited to, those compounds which contain a metal cation complex selected from the group consisting of $[Co(8\text{-hydroxyquinoline})_2(NH_3)_2]^+$, $[Co(8\text{-hydroxyquinoline})_2(2,2'\text{-dipyridyl})]^+$, $Mn(2,2'\text{-dipyridyl})_2^{++}$, $Mn(2,2'\text{-dipyridyl})_3^{++}$ and $Mn(1,10\text{-phenanthroline})_3^{++}$.

Preferred phosphonium iodides for use in the practice of the invention are of the formula:

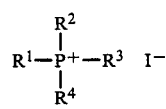

wherein $R^1$, $R^2$l, $R^3$ and $R^4$ are independently selected from the group consisting of hydrocarbyl groups containing from 1 to 20 carbon atoms. More preferably, $R^1$, $R^2$, $R^3$ and $R^4$ are independently selected from the group consisting of alkyl groups of from 1 to 10 carbon atoms and aryl and alkyl-substituted aryl groups of from 6 to 12 carbon atoms.

The iodide salt or combination of iodide salts utilized in the practice of this invention desirably have a solubility in the electrolyte which is sufficient to yield an initial iodide concentration of at least about 0.2 normal. For example, lithium iodide is substantially insoluble in pure sulfur dioxide and will not afford such a concentration under ordinary conditions. However, the use of a minor amount of a polar organic solvent, such as tetrahydrofuran, as a cosolvent serves to dramatically increase the solubility of lithium iodide in sulfur dioxide well in excess of the amount required to afford an initial iodide ion concentration of 0.2 normal. If the use of a polar organic solvent is not desired, other iodide salts can be used, either alone or in combination with lithium iodide, to provide a sufficient initial iodide ion concentration when pure sulfur dioxide is utilized as the electrolyte solvent.

We have found that in an electrolyte solution comprising a solution of at least one iodide salt in sulfur dioxide, iodide ion is partially oxidized to iodine as a consequence of reaction with the sulfur dioxide. We have also found that this reaction does not require the presence of oxygen ($O_2$). However, this oxidation process does not take place to any significant degree except at relatively high iodide ion concentrations. More specifically, we have found that the initial iodide ion concentration must be at least about 0.2 normal. For example, lithium iodide is essentially insoluble in sulfur dioxide, and 0.2 moles of lithium iodide will not dissolve in a liter of liquid sulfur dioxide. In the absence of molecular oxygen ($O_2$), we have found that such a mixture can be stirred for at least 72 hours at room temperature without the visible formation of any iodine. However, if the lithium iodide is solubilized in the sulfur dioxide by addition of a minor amount of a polar organic solvent, such as tetrahydrofuran, or of a suitable salt, such as trisbipyridyl manganous perchlorate, a dark coloration rapidly forms in the resulting solution as a consequence of the formation of iodine. Preferred electrolytes for use in the practice of this invention are essentially free of molecular oxygen ($O_2$).

Although the subject invention is not to be so limited, it is believed that the cathode reaction of our electrochemical cell can be represented by equations (1) and (2), the anode reaction by equation (3) and the overall cell reaction by equation (4). Accordingly, it is $$I_2 + 2e^- \rightarrow 2I^- \tag{1}$$

$$2I^- + SO_2 + Li^+ \rightarrow I_2 + LiS_xO_y \tag{2}$$

$$Li \rightarrow Li_+ + e^- \tag{3}$$

$$Li + SO_2 \rightarrow LiS_xO_y \tag{4}$$

believed that the electrochemical cell of this invention operates by means of an iodine catalyzed cathode. The iodine which is initially reduced to iodide ion at the cathode in accordance with equation (1) is subsequently regenerated by spontaneous reaction of iodide ion with sulfur dioxide in accordance with equation (2). It should be noted that equations (2) and (4) are not balanced because the precise chemical identity of $LiS_xO_y$ is unknown.

In the practice of this invention, the combined concentration of iodine and iodide ion in the electrolyte must be at least about 0.2 normal, preferably at least about 0.5 normal and more preferably at least about 1.0 normal. In this context, it will be understood that the normality is calculated on the basis of the number of iodine atoms present. For example, a solution that is 1 molar in iodine ($I_2$) is 2 normal for the purposes hereof, whereas a solution which is 1 molar in iodide ion ($I^-$) is also 1 normal. Accordingly, a solution that is 1 molar in iodine and 1 molar in iodide ion has a combined concentration of iodine and iodide ion of 3 normal.

Although the combined concentration of iodine and iodide ion in the electrolyte must be at least about 0.2 normal in the practice of this invention, it will be understood that under equilibrium conditions the individual concentrations of iodine and iodide ion will be determined by equation (5) [it should be noted that equation (5) is not balanced because the precise chemical identity of $S_xO_y^-$ is unknown]. It will also be $$2I^- + SO_2 \rightleftharpoons I_2 + S_xO_y^- \tag{5}$$

appreciated that factors such as the presence or absence of a polar organic solvent, the precise identity of any such polar organic solvent and the nature of the electrolyte salts present will have an influence on the equilibrium concentrations of iodine and iodide ion. Accordingly, the equilibrium concentration of either iodine or iodide ion in the electrolyte can be quite small even though the combined concentration of iodine and iodide ion is 0.2 normal or larger.

If desired, elemental iodine and/or one or more iodide salts can be used in preparing the electrolyte. However, because of the above-described spontaneous oxidation of iodide ion to iodine by sulfur dioxide, it is ordinarily more convenient to prepare the electrolyte using only iodide salts.

The improved cathode discharge capacity of the electrochemical cell of this invention is believed to be a result of the conversion of iodine to a soluble iodide product at the cathode. The insoluble discharge product which is subsequently formed by reaction of iodide ion with sulfur dioxide is then distributed more uniformly throughout the cell than would be the case in the absence of the iodine-iodide ion couple. For example, in the case of a porous carbon cathode, it is believed that the insoluble discharge product is distributed more uniformly throughout the entire cell with the result that there is a reduced closing of pore mouths in the cathode by deposits of insoluble reaction products at high currents.

In the case of lithium-sulfur dioxide electrochemical cells which are constructed with a carbon cathode, the presence in the electrolyte of the iodine-iodide ion couple of this invention results in a safer cell since, under forced discharge lithium-limited conditions, a harmless oxidation of iodide ion occurs at the anode together with reduction of iodine at the carbon cathode. In addition, the reduced pore mouth plugging described above results in a safer cell under high rate forced discharge conditions even when the cell is not lithium-limited.

The electrolyte used in the practice of this invention additionally comprises at least one dissolved lithium salt. This salt serves to improve the conductivity of the electrolyte. In addition, a high lithium cation ($Li^+$) concentration in the electrolyte is highly desirable since this is believed to promote the formation of a passivating film of lithium dithionite on the lithium anode. Further, lithium cations from the lithium salt combine with $S_xO_y^-$ of equation (5) to form $LiS_xO_y$ which is relatively insoluble in the electrolyte. As a consequence of the relative insolubility of $LiS_xO_y$, the equilibrium described by equation (5) is shifted to the right. The lithium cation concentration of the electrolyte is desirably at least about 0.2 normal, preferably at least about 0.5 normal and more preferably at least about 1.0 normal.

Suitable lithium salts for use in the practice of this invention include, but are not limited to, lithium iodide, lithium perchlorate, lithium dithionite, lithium sulfate, lithium tetrafluoroborate, lithium hexafluorophosphate, lithium bromide, lithium aluminum chloride and lithium gallium chloride. Preferred lithium salts include lithium iodide, lithium perchlorate, lithium bromide, lithium tetrafluoroborate, lithium hexafluorophosphate, lithium aluminum chloride and lithium gallium chloride. It will be appreciated, of course, that lithium iodide can simultaneously function as both the lithium salt and the iodide salt which are required in the practice of this invention.

The anode used in the electrochemical cell of this invention can be constructed from either substantially pure lithium or a lithium alloy. Suitable lithium alloys for this purpose include, but are not limited to, lithium-aluminum, lithium-silicon and lithium-Wood's metal alloys.

The electrolyte for use in the electrochemical cell of this invention comprises sulfur dioxide as the cathode depolarizer which is electrochemically reduced during discharge of the electrochemical cell. As noted above, it is believed that this reduction of sulfur dioxide is catalyzed by interaction with the iodine-iodide ion couple as set forth in equations (1) and (2). In the absence of any surface contamination on the lithium anode which can initiate self-discharge, the cathode depolarizer is stable when in contact with this electrode. Although the reasons for this are not well understood, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction at the lithium anode to take place during operation of the cell by passage of lithium cations through the film.

The electrolyte for use in the electrochemical cell of this invention can additionally comprise dissolved electrolyte salts other than the required iodide and lithium salts. Such additional electrolyte salts are selected and utilized in amounts which are effective to provide an improved conductivity for efficient operation of the electrochemical cell. Suitable additional electrolyte salts include, but are not limited to, salts containing metal cation complexes, quaternary ammonium salts, phosphonium salts, pyridinium salts and arsonium salts. However, salts containing metal cation complexes are preferred.

Various combinations of electrolyte salts comprising at least one material selected from the group consisting of salts containing metal cation complexes, quaternary ammonium salts, phosphonium salts, pyridinium salts and arsonium salts in combination with one or more lithium salts are frequently useful. A preferred combination of electrolyte salts comprises the combination of one or more lithium salts with at least one lithium-free salt selected from the group consisting of salts containing metal cation complexes.

Suitable lithium-free electrolyte salts which contain a metal cation complex include, but are not limited to, salts which contain a cation selected from the group consisting of $Mn(2,2'-dipyridyl)_2^{++}$ and $Mn(2,2'-dipyridyl)_3^{++}$.

Preferred quaternary ammonium salts for use as lithium-free electrolyte salts are of the formula:

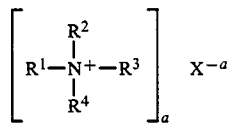

wherein $R^1$, $R^2$, $R^3$ and $R^4$ are independently selected from the group consisting of hydrocarbyl groups containing from 1 to 20 carbon atoms and $X^{-a}$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups having from 1 to 10 carbon atoms and $X^{-a}$ is selected from the group consisting of perchlorate, tetrafluoroborate, hexafluorophosphate and iodide. Examples of suitable quaternary ammonium salts include tetrabutylammonium perchlorate, tetrahexylammonium perchlorate, tetramethylammonium tetrafluoroborate and tetrapropylammonium hexafluorophosphate.

In addition to sulfur dioxide, iodine, iodide salt and lithium salt, the electrolyte for use in the electrochemical cell of this invention can additionally comprise one or more polar organic solvents which lack acidic hydrogen atoms and contain one or more atoms having at least one unshared pair of electrons. For the purposes hereof, "acidic hydrogen atoms" are those hydrogen atoms which are capable of being readily abstracted by lithium metal. However, strongly basic solvents such as amines are not generally desirable.

More specifically, suitable polar organic solvents are liquids which contain at least one element which is selected from Groups 3a, 4a, 5a and 6a of the Periodic Table (*Handbook of Chemistry and Physics*, 57th ed., 1976–77, p. B–4). Preferred elements from this group include, for example, boron, silicon, nitrogen, phosphorus oxygen and sulfur as well as combinations of these elements.

Preferred polar organic solvents for use in the practice of this invention include, but are not limited to, trialkyl borates, boronic acid esters, borinic acid esters, tetraalkyl silicates, alkylalkoxyl silanes, nitroalkanes, alkyl nitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, diakyl sulfates, dialkyl sulfites, alkylene sulfites and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol dimethyl ether, acetic anydride, dimethyl sulfate, dimethyl sulfite, ethylene sulfite and tetramethylene sulfone.

Highly preferred polar organic solvents for use in the practice of this invention include alkyl nitriles, dialkyl amides, lactams, monocarboxylic acid esters, ortho esters, lactones, dialkyl carbonates, alkylene carbonates, orthocarbonates, monoethers and polyethers. Tetrahydrofuran is a particularly preferred specific example.

When a polar organic solvent is used as an electrolyte component in the practice of this invention, the electrolyte desirably comprises a mixture of sulfur dioxide and at least one polar organic solvent, wherein the amount of sulfur dioxide is in the range from about 25 to about 99 percent by weight based on the combined weight of polar organic solvent and sulfur dioxide. More preferably, the amount of sulfur dioxide is in the range from about 50 to about 95 percent by weight based on the combined weight of polar organic solvent and sulfur dioxide.

The use of a polar organic solvent as an electrolyte component is a preferred embodiment of this invention when lithium iodide is used as a source of iodide ion since the organic solvent ordinarily serves to increase the solubility of the lithium iodide. A preferred electrolyte for use in the electrochemical cell of this invention is prepared by the process which comprises dissolving lithium iodide in a mixture of sulfur dioxide and polar organic solvent. Desirably, at least about 0.2 mole of lithium iodide is utilized per liter of said mixture of sulfur dioxide and polar organic solvent. Preferably, at least about 1.0 mole of lithium iodide is utilized per liter of said mixture of sulfur dioxide and polar organic solvent.

The cathode of the electrochemical cell can be constructed of any material which is electrically conducting and is substantially inert to the electrolyte system. In addition, the cathode material is desirably catalytic with respect to electroreduction of sulfur dioxide, the cathode depolarizer. Preferred materials include metals of the platinum group family consisting of platinum, iridium, osmium, palladium, rhodium and ruthenium; carbon in any of its common electrode forms; iron in its various forms, particularly as stainless steel; and metals from the group consisting of titanium, nickel, silver, mercury, lead and gold. Less preferred materials are metals of the families of vanadium, chromium and manganese [Groups 5b, 6b, and 7b of the Periodic Table of Elements (*Handbook of Chemistry and Physics,* 57th ed., 1976-77, p. B-4)]; metals from the group consisting of zirconium, cobalt, copper, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like. Highly preferred cathode materials include graphite or carbon bonded to an electrically conducting metal screen.

The following examples are intended only to illustrate the invention and are not to be construed as imposing limitations on it.

EXAMPLE I

A rechargeable electrochemical cell was constructed which contained two thin porous carbon electrodes (one as a cathode current collector and the other as a reference electrode) and a lithium foil anode which was 0.036 mm thick and had a total surface area of 1 cm$^2$. Both carbon electrodes were composed of 15% Teflon and 85% carbon (acetylene black obtained from the Shawinigan Products Department of Gulf Oil Chemicals Company), and the carbon electrode serving as the cathode current collector had a total surface area of 1.4 cm$^2$ (0.7 cm$^2$ on each side). The electrolyte was prepared by dissolving lithium iodide and lithium perchlorate in a mixture of sulfur dioxide and tetrahydrofuran which contained 78 percent by weight of sulfur dioxide based on the combined weight of sulfur dioxide and tetrahydrofuran. The amount of lithium iodide and lithium perchlorate employed was equal to 0.2 and 0.9 mole, respectively, per liter of the mixture of sulfur dioxide and tetrahydrofuran. A very dark coloration rapidly developed in the electrolyte as a consequence of the in situ formation of iodine. The resulting cell was subjected to a series of charge/discharge cycles, where each cycle consisted of a one-hour discharge period followed by a one-hour charge period, over a range of current densities at the carbon cathode. The limiting cathode current density was found to be 0.16 ma/cm$^2$ with the discharge potential dropping toward the sulfur dioxide reduction potential at 0.18 ma/cm$^2$ and reaching the sulfur dioxide reduction potential at 0.21 ma/cm$^2$.

EXAMPLE II

A rechargeable electrochemical cell was prepared as described in Example I except that the amount of lithium iodide and lithium perchlorate used in preparing the electrolyte was equal to 0.7 mole each per liter of the mixture of sulfur dioxide and tetrahydrofuran (the electrolyte rapidly developed a very dark coloration as a consequence of the in situ formation of iodine). The resulting cell was subjected to a series of charge/discharge cycles, where each cycle consisted of a four-hour discharge period followed by a four-hour charge period, over a range of current densities at the carbon cathode. The limiting cathode current density was found to be about 1.5 ma/cm$^2$ or about ten times larger than that obtained in Example I.

EXAMPLE III

A rechargeable electrochemical cell was prepared as described in Example I except that the electrolyte contained no lithium perchlorate and was prepared by dissolving an amount of lithium iodide in the sulfur dioxide-tetrahydrofuran mixture equal to 1.9 moles per liter (the electrolyte rapidly developed a very dark coloration as a consequence of the in situ formation of iodine). The resulting cell was subjected to a series of charge/discharge cycles where each cycle consisted of a twelve-hour discharge period followed by a twelve-hour charge period at a cathode current density of 3 ma/cm$^2$ or about nineteen times the limiting cathode current density measured in Example I.

EXAMPLE IV

An electrochemical cell was prepared as described in Example I except that a lithium reference electrode was also present and the electrolyte was prepared by dissolving trisbipyridyl manganous perchlorate and lithium iodide in liquid sulfur dioxide (the electrolyte rapidly developed a very dark coloration as a consequence of the in situ formation of iodine). The amount of trisbipyridyl manganous perchlorate and lithium iodide used was equal to 0.5 and 0.8 mole, respectively, per liter of sulfur dioxide. The resulting cell had an initial open circuit voltage of 3.05 volts and was discharged at a cathode current density of 2 ma/cm$^2$ to a cutoff voltage of 2.6 volts. The cell had a capacity, relative to the cathode, of 68 mahr/cm$^2$.

EXAMPLE V

An electrochemical cell was prepared as described in Example IV except that the amount of trisbipyridyl manganous perchlorate and lithium iodide used was equal to 0.5 and 0.9 mole, respectively, per liter of sulfur dioxide (the electrolyte rapidly developed a very dark coloration as a consequence of the in situ formation of iodine). The resulting cell had a very stable open circuit voltage, and the long-term discharge limiting current density for the lithium anode was 200-250 $\mu$A/cm$^2$. The cathode performance was evaluated with the carbon reference electrode using a series of charge/discharge cycles, where each cycle consisted of a three-hour discharge period followed by a three-hour charge period, and a maximum overvoltage of 150 millivolts was measured at a current density of 2 ma/cm$^2$. This cathode behavior indicates the presence of iodide ion and suggests that equation (2) does not go to completion. In the absence of iodide ion, very low discharge capacities are observed together with overvoltages during charge periods which are substantially in excess of 150 millivolts.

EXAMPLE VI

A rechargeable electrochemical cell was prepared as described in Example II except that the lithium foil anode was 1.0 mm thick and the electrolyte was a 1.0 molar solution of lithium perchlorate in a mixture of sulfur dioxide and 2-methyltetrahydrofuran which contained 80 percent by weight of sulfur dioxide based on the combined weight of sulfur dioxide and 2-methyltetrahydrofuran. At a current density of 2 ma/cm$^2$ and compared to the cell of Example II, the cathode polarization during charge of the resulting cell was higher by a factor of ten and the polarization on discharge was higher by a factor of six. At a current density of 2 ma/cm$^2$ and compared with the cell of Example IV, the resulting cell had a cathode discharge capacity which was lower by a factor of eight. Accordingly, the presence of the iodine-iodide ion couple of this invention in the electrolyte of a lithium-sulfur dioxide electrochemical cell serves to reduce cathode polarization upon charge and discharge of the cell and also improves the cathode discharge capacity.

We claim:

1. An electrochemical cell comprising in combination:
   (a) an anode which is comprised of lithium;
   (b) a cathode; and
   (c) a nonaqueous conductive electrolyte which comprises a solution of iodine and lithium iodide in sulfur dioxide, wherein the combined concentration of iodine and iodide ion in said electrolyte is at least about 0.2 normal and the lithium cation concentration in said electrolyte is at least about 0.2 normal.

2. The electrochemical cell of claim 1 wherein said cathode is comprised of carbon.

3. The electrochemical cell of claim 1 wherein said electrolyte is essentially free of molecular oxygen.

4. The electrochemical cell of claim I wherein said electrolyte additionally comprises at least one lithium-free electrolyte salt which is selected from the group consisting of salts containing metal cation complexes, quaternary ammonium salts, phosphonium salts, pyridinium salts and arsonium salts.

5. The electrochemical cell of claim I wherein said anode is fabricated from a lithium-aluminum alloy.

6. An electrochemical cell comprising in combination:
   (a) an anode which is comprised of lithium;
   (b) a cathode; and
   (c) a nonaqueous conductive electrolyte which comprises a solution of iodine and lithium iodide in a mixture of sulfur dioxide and at least one polar organic solvent, wherein the amount of sulfur dioxide in said mixture of sulfur dioxide and polar organic solvent is in the range from about 25 to about 99 percent by weight, the combined concentration of iodine and iodide ion in said electrolyte is at least about 0.2 normal and the lithium cation concentration in said electrolyte is at least about 0.2 normal.

7. The electrochemical cell of claim 6 wherein said cathode is comprised of carbon.

8. The electrochemical cell of claim 6 wherein said electrolyte is essentially free of molecular oxygen.

9. The electrochemical cell of claim 6 wherein the amount of sulfur dioxide in said mixture of sulfur dioxide and polar organic solvent is in the range from about 50 to about 95 percent by weight.

10. The electrochemical cell of claim 6 wherein said polar organic solvent is selected from the group consisting of alkyl nitriles, dialkyl amides, lactams, monocarboxylic acid esters, ortho, esters, lactones, dialkyl carbonates, alkylene carbonates, orthocarbonates, monoethers and polyethers.

11. The electrochemical cell of claim 10 wherein said polar organic solvent is tetrahydrofuran.

12. The electrochemical cell of claim 6 wherein said electrolyte additionally comprises at least one lithium-free electrolyte salt which is selected from the group consisting of salts containing metal cation complexes, quaternary ammonium salts, phosphonium salts, pyridinium salts and arsonium salts.

13. The electrochemical cell of claim 6 wherein said electrolyte additionally comprises a ithium-free salt which contains a cation selected from the group consisting of Mn(2,2'-dipyridyl)$_2^{++}$ and Mn(2,2'-dipyridyl)$_3^{++}$.

14. The electrochemical cell of claim 6 wherein said electrolyte additionally comprises a quaternary ammonium salt of the formula:

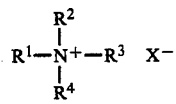

wherein $R^1$, $R^2$, $R^3$ and $R^4$ are independently selected from the group consisting of alkyl groups of from 1 to 10 carbon atoms and $X^-$ is an anion selected from the group consisting of perchlorate, tetrafluoroborate, hexafluorophosphate and iodide.

15. The electrochemical cell of claim 6 wherein said nonaqueous conductive electrolyte is prepared by the process which comprises dissolving lithium iodide in said mixture of sulfur dioxide and polar organic solvent.

16. The electrochemical cell of claim 15 wherein at least about 1.0 mole of lithium iodide is utilized per liter of said mixture of sulfur dioxide and polar organic solvent.

17. The electrochemical cell of claim 15 wherein said polar organic solvent comprises tetrahydrofuran.

18. The electrochemical cell of claim 6 wherein said anode is fabricated from a lithium-aluminum alloy.

* * * * *

UNITED STATES PATENT OFFICE
CERTIFICATE OF CORRECTION

Patent No. 4,889,779　　　　　　　　Dated December 26, 1989

Inventor(s)　　　John F. Connolly and Robert J. Thrash

It is certified that error appears in the above-identified patent and that said Letters Patent is hereby corrected as shown below:

Column 1, line 14, "Invention" should read --Invention.--.

Column 2, lines 20-21, "contains a aqueous" should read --contains a lithium anode, iodine as the cathode depolarizer, a non-aqueous--.

Column 2, line 37, "the and surface." should read --the anode surface.--.

Column 4, line 38, "Mn(2,2'-dipyridyl)$_2$==" should read --Mn(2,2'-dipyridyl)$_2$++--.

Column 13, line 2, "ithium-free" should read --lithium-free--.

Signed and Sealed this

Tenth Day of November, 1992

Attest:

DOUGLAS B. COMER

Attesting Officer　　　　Acting Commissioner of Patents and Trademarks